United States Patent
Feng et al.

(10) Patent No.: US 11,082,919 B2
(45) Date of Patent: Aug. 3, 2021

(54) DATA PROCESSING METHOD AND TERMINAL

(71) Applicant: Huawei Technologies Co., Ltd., Shenzhen (CN)

(72) Inventors: Peng Feng, Wuhan (CN); Bin Luo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 16/473,861

(22) PCT Filed: May 22, 2017

(86) PCT No.: PCT/CN2017/085334
§ 371 (c)(1),
(2) Date: Jun. 26, 2019

(87) PCT Pub. No.: WO2018/120607
PCT Pub. Date: Jul. 5, 2018

(65) Prior Publication Data
US 2019/0342830 A1    Nov. 7, 2019

(30) Foreign Application Priority Data
Dec. 30, 2016   (CN) .......................... 201611265367.1

(51) Int. Cl.
*H04W 52/02* (2009.01)
*H04W 8/00* (2009.01)
(Continued)

(52) U.S. Cl.
CPC ....... *H04W 52/0216* (2013.01); *H04W 8/005* (2013.01); *H04W 8/245* (2013.01); *H04W 48/20* (2013.01); *H04W 88/08* (2013.01)

(58) Field of Classification Search
CPC . H04W 52/0216; H04W 8/005; H04W 8/245; H04W 48/20; H04W 88/08
See application file for complete search history.

(56) References Cited

U.S. PATENT DOCUMENTS

| 8,977,876 B2 * | 3/2015 | Yang | G06F 1/3234 |
| | | | 713/320 |
| 2010/0067416 A1 * | 3/2010 | Gao | H04W 52/0274 |
| | | | 370/311 |

(Continued)

FOREIGN PATENT DOCUMENTS

| CN | 102984197 A | 3/2013 |
| CN | 104182029 A | 12/2014 |

(Continued)

OTHER PUBLICATIONS

Machine Translation and Abstract of Chinese Publication No. CN105573460, May 11, 2016, 19 pages.

(Continued)

*Primary Examiner* — Duc C Ho
(74) *Attorney, Agent, or Firm* — Conley Rose, P.C.

(57) ABSTRACT

A method includes obtaining a first network wakeup parameter, where the first network wakeup parameter is used to wake up an application program. The method further includes performing reconfiguration processing on the first network wakeup parameter based on a preset first configuration condition to obtain a second network wakeup parameter. The method further includes configuring a driver of the terminal based on the second network wakeup parameter. The second network wakeup parameter is written into Wi-Fi firmware such that the Wi-Fi firmware directly performs processing without waking up the application program when the first network wakeup parameter is received next time.

20 Claims, 4 Drawing Sheets

(51) Int. Cl.
*H04W 8/24* (2009.01)
*H04W 48/20* (2009.01)
*H04W 88/08* (2009.01)

(56) References Cited

U.S. PATENT DOCUMENTS

| | | | |
|---|---|---|---|
| 2012/0032682 | A1 | 2/2012 | Robertson |
| 2012/0309376 | A1 | 12/2012 | Huang et al. |
| 2013/0057908 | A1 | 3/2013 | Park |
| 2013/0125130 | A1 | 5/2013 | Stubbs et al. |
| 2014/0098727 | A1 | 4/2014 | Murabito et al. |
| 2014/0195839 | A1 | 7/2014 | Chueh et al. |
| 2015/0139056 | A1* | 5/2015 | Wang ............ H04W 48/12 370/311 |
| 2016/0234783 | A1* | 8/2016 | Xing ............ H04W 76/27 |

FOREIGN PATENT DOCUMENTS

| | | |
|---|---|---|
| CN | 104219746 A | 12/2014 |
| CN | 105573460 A | 5/2016 |
| CN | 105677379 A | 6/2016 |
| CN | 106168902 A | 11/2016 |
| WO | 2016112586 A1 | 7/2016 |

OTHER PUBLICATIONS

Machine Translation and Abstract of Chinese Publication No. CN106168902, Nov. 30, 2016, 29 pages.
Foreign Communication From A Counterpart Application, Chinese Application No. 201780009053.1, Chinese Office Action dated Nov. 26, 2019, 6 pages.
Machine Translation and Abstract of Chinese Publication No. CN104182029, Dec. 3, 2014, 14 pages.
Machine Translation and Abstract of Chinese Publication No. CN104219746, Dec. 17, 2014, 22 pages.
Machine Translation and Abstract of Chinese Publication No. CN105677379, Jun. 15, 2016, 13 pages.
Foreign Communication From A Counterpart Application, European Application No. 17886073.0, Extended European Search Report dated Sep. 3, 2019, 8 pages.
Foreign Communication From A Counterpart Application, PCT Application No. PCT/CN2017/085334, English Translation of International Search Report dated Aug. 29, 2017, 2 pages.
Foreign Communication From A Counterpart Application, PCT Application No. PCT/CN2017/085334, English Translation of Written Opinion dated Aug. 29, 2017, 3 pages.
Li, T., et al, "Low-Power Pervasive Wi-Fi Connectivity Using WiScan," UBICOMP '15, Sep. 7-11, 2015, Osaka, Japan, 12 pages.

* cited by examiner

DATA PROCESSING METHOD AND TERMINAL

CROSS-REFERENCE TO RELATED APPLICATIONS

This application is a national stage of International Application No. PCT/CN2017/085334 filed on May 22, 2017, which claims priority to Chinese Patent Application No. 201611265367.1 filed on Dec. 30, 2016. Both of the aforementioned applications are hereby incorporated by reference in their entireties.

TECHNICAL FIELD

Embodiments of this application relate to the data processing field, and in particular, to a data processing method and a terminal.

BACKGROUND

Currently, an operating system (OS) used by a personal computer (personal computer, PC) product, such as a desktop computer, an all-in-one machine, a notebook computer, a palmtop computer, or a tablet computer, can be upgraded to a Win10 system. The Win10 system provides a connected standby (Connected Standby, CS) mode and a modem standby (Modem Standby, MS) mode.

In the prior art, as shown in FIG. 1, FIG. 1 is a schematic flowchart of waking up a system on chip (System on Chip, SOC) in the prior art. As shown in FIG. 1, when any application program is installed on a terminal, a network wakeup parameter may be delivered to a Wi-Fi drive by using an operating system (Operating System, OS). The network wakeup parameter is network data and is used to wake up the application program. When the terminal enters the CS mode, a protocol stack of a Wi-Fi chip communicates with a network, and the OS instructs the Wi-Fi drive to deliver the network wakeup parameter to Wi-Fi firmware of the Wi-Fi chip. When the Wi-Fi firmware receives the network wakeup parameter by using the protocol stack, the application program in the SOC can be woken up. However, in the prior art, the network data is not managed or controlled. Consequently, each time the Wi-Fi firmware receives the network wakeup parameter, the application program is woken up. Frequent wakeup of the application program increases power consumption of the terminal and shortens a standby time.

SUMMARY

Embodiments of this application provide a data processing method. Network data received by a Wi-Fi drive is processed to resolve problems of high power consumption of a terminal in a standby mode and a short standby time of the terminal that are caused because an SOC is frequently woken up in a CS mode or an MS mode.

According to a first aspect, a data processing method is provided, and the method includes: obtaining a first network wakeup parameter, where the first network wakeup parameter is used to wake up an application program; performing reconfiguration processing on the first network wakeup parameter based on a preset first configuration condition to obtain a second network wakeup parameter; and configuring a driver of the terminal based on the second network wakeup parameter.

In a possible implementation, the method further includes: writing the second network wakeup parameter into Wi-Fi firmware. The second network wakeup parameter is written into the Wi-Fi firmware, so that the Wi-Fi firmware directly performs processing without waking up the application program when the first network wakeup parameter is received next time. Therefore, power consumption of the terminal is reduced, and a standby time of the terminal is prolonged.

In a possible implementation, after the configuring a driver of the terminal, the method further includes: updating the first configuration condition to obtain a second configuration condition; obtaining a third network wakeup parameter currently configured by the driver; performing reconfiguration processing on the third network wakeup parameter based on the second configuration condition to obtain a fourth network wakeup parameter; and sending the fourth network wakeup parameter to the driver. In this way, a network wakeup parameter is processed by a power saving service program and the driver. This reduces a quantity of times the application program is woken up, reduces power consumption of the terminal, and prolongs a standby time of the terminal.

In a possible implementation, the method further includes: receiving a current wakeup event sent by the driver, and setting, based on the current wakeup event, a network wakeup parameter corresponding to the current wakeup event. In this way, the driver actively reports the current wakeup event to the power saving service program. Subsequently, the power saving service program may reconfigure the network wakeup parameter of the current wakeup event to reduce power consumption of the terminal and prolong a standby time of the terminal.

According to a second aspect, a terminal is provided, including a processor, a memory, a bus, and a communications interface, where the memory is configured to store a computer executable instruction, the processor and the memory are connected by using the bus, and when the terminal runs, the processor executes the computer executable instruction stored in the memory, so that the terminal performs the method according to any one of the first aspect and the possible implementations of the first aspect.

According to a third aspect, a terminal is provided, and the terminal includes a memory and a processor, where the memory and the processor are connected by using a bus, the memory is configured to store computer program code, and the computer program code includes an instruction; and the processor is configured to: obtain a first network wakeup parameter, where the first network wakeup parameter is used to wake up an application program; perform reconfiguration processing on the first network wakeup parameter based on a preset first configuration condition to obtain a second network wakeup parameter; and configure a driver of the terminal based on the second network wakeup parameter.

In a possible implementation, the processor is further configured to write the second network wakeup parameter into firmware.

In a possible implementation, the processor is further configured to update the first configuration condition to obtain a second configuration condition; the processor is further configured to obtain a third network wakeup parameter currently configured by the driver; and the processor is further configured to: perform reconfiguration processing on the third network wakeup parameter based on the second configuration condition to obtain a fourth network wakeup parameter; and send the fourth network wakeup parameter to the driver.

In a possible implementation, the processor is further configured to: receive a current wakeup event sent by the driver; and set, based on the current makeup event, a network wakeup parameter corresponding to the current wakeup event.

According to a third aspect, a computer readable storage medium storing a program is provided, where the program includes an instruction, and when the instruction is executed by a terminal, the terminal performs the method according to any one of the first aspect and the possible implementations of the first aspect.

DESCRIPTION OF EMBODIMENTS

This application relates to a terminal device. The terminal device includes but is not limited to a mobile phone (such as a smartphone), a tablet computer (Pad), a personal digital assistant (Personal Digital Assistant, PDA), a portable device (such as a portable computer), a wearable device, or the like. This is not specifically limited in the embodiments of this application.

An application scenario of a data processing method provided in this application is a PC product on which a Windows 10 system or a system of a later version is installed.

Figure 1:
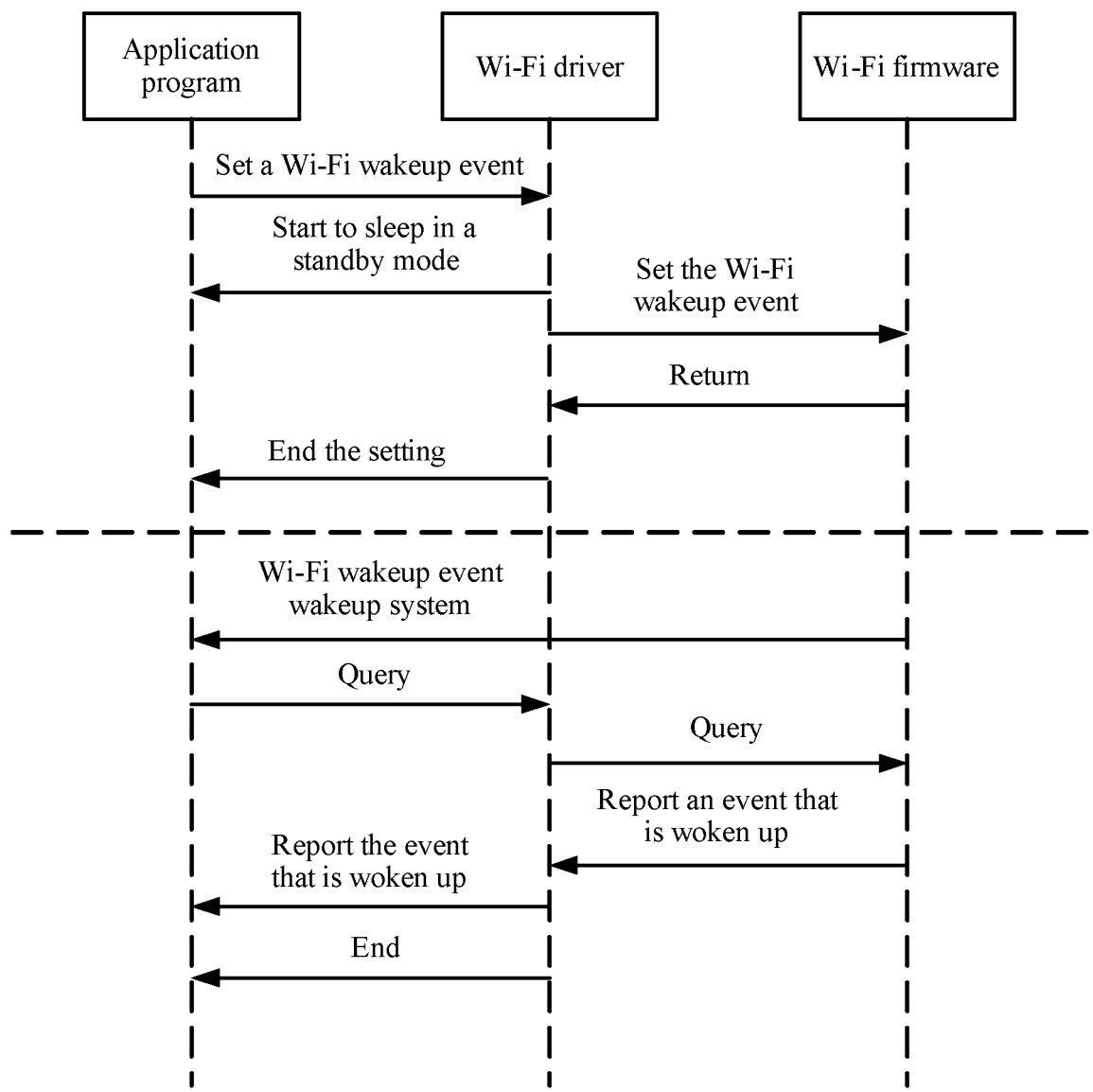
FIG. 1 is a schematic flowchart of waking up an SOC in the prior art.
Figure 2:
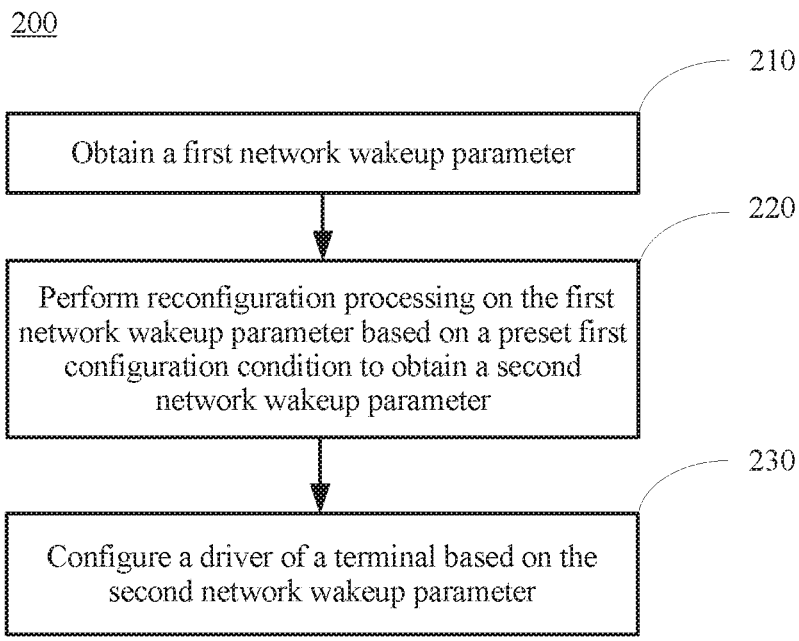
FIG. 2 is a flowchart of a data processing method according to an embodiment of this application.

FIG. 2 is a flowchart of a data processing method according to an embodiment of this application. As shown in FIG. 2, the data processing method includes the following steps.

Step 210: Obtain a first network wakeup parameter, where the first network wakeup parameter is used to wake up an application program.

In an embodiment, when the application program sets a network wakeup parameter for a driver, and the driver receives the first network wakeup parameter sent by the application program, the driver actively reports the first network wakeup parameter to a power saving service program. The power saving service program may perform subsequent reconfiguration processing on the first network wakeup parameter. The application program may be an application program client installed on a terminal, such as WeChat or QQ. The driver may be a Wi-Fi (or a wireless local area network based on IEEE 802.11) driver.

The first network wakeup parameter may be eight types of network data defined by Microsoft. The types are as follows:
1. Magic packet (Magic packet)
2. Media connect/disconnect (Media connect/Disconnect)
3. Network list offload (network list offload discovery, NLO) discovery (NLO discovery)
4. 802.1x Extensible Authentication Protocol request/identity packet (802.1x Extensible Authentication Protocol, 802.1x EAP-Request/Identity packet)
5. Disassociation with an access point (Disassociates with the access point)
6. GNU image manipulation program toolkit (GNU Image Manipulation Program Toolkit, GTK) handshake error (GTK Handshake error)
7. IEEE 802.11i robust security network (Robust Security Network, RSN) 4-way handshake with a wireless access point (Wireless Access Point, AP) (IEEE 802.11i RSN 4-way handshake with the AP)
8. Rekeying failure (Rekeying failure)

The first network wakeup parameter may be alternatively the following six types of standard information defined by Microsoft, for example:

L3 Keep Alive (L3 Keep Alive), Enabled Wake Source (Enabled Wake Source), Pattern List (Pattern list), Last Wake Results (Last wake results), Last Wake Time (Last wake time, TSC). Debug Data From Last Wake (Debug data from Last wake), Offloads (Address Resolution Protocol (Address Resolution Protocol, ARP), Name Server (Name Server, NS), and GNU Image Manipulation Program Toolkit (GNU Image Manipulation Program Toolkit, GTK).

Four of the six types of standard information may be set, so that when a message about the four types of standard information is received, Wi-Fi firmware directly performs processing without waking up the application program.

A parameter of a Wi-Fi network adapter is set in L3 Keep Alive, namely, an L3 protocol layer. L3 Keep Alive is in an inactive state by default. The L3 protocol layer may be set to an active state. If there is an L3 message, the message is directly processed in firmware of the network adapter. Enabled Wake Source includes a wakeup source and a wakeup event, and may include wakeup events of all application programs on the terminal. If Enabled Wake Source is set to a wakeup forbidden state, none of the application programs can be woken up. Pattern List is a specific application program in the wakeup source, such as QQ. If Pattern List is set to the wakeup forbidden state, the QQ application program cannot be woken up. Similar to L3 Keep Alive, Offloads (ARP, NS, GTK) is also a protocol.

Step 220: Perform reconfiguration processing on the first network wakeup parameter based on a preset first configuration condition to obtain a second network wakeup parameter.

The first configuration condition is preset in the power saving service program. The first network wakeup parameter may be filtered (reconfiguration processing). The reconfiguration processing may be processing such as deleting or rewriting the first network wakeup parameter.

Step 230: Configure a driver of the terminal based on the second network wakeup parameter.

In an embodiment, the terminal may write the second network wakeup parameter into the driver.

Optionally, after step 230, the method further includes: writing the second network wakeup parameter into the Wi-Fi firmware.

When an OS enters a sleep mode next time, the driver writes the second network wakeup parameter into the firmware, so that the firmware directly performs processing without waking up the application program when the first network wakeup parameter is received next time. Therefore, power consumption of the terminal is reduced, and a standby time of the terminal is prolonged.

Figure 3:
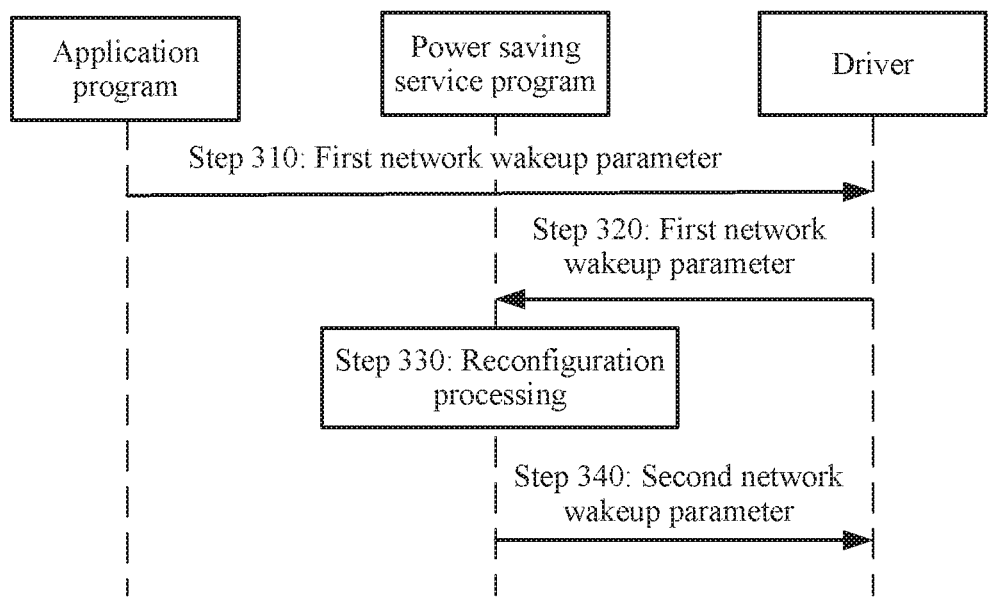
FIG. 3 is a diagram of interaction between an application program, a power saving service program, and a driver according to an embodiment of this application.
Figure 4:
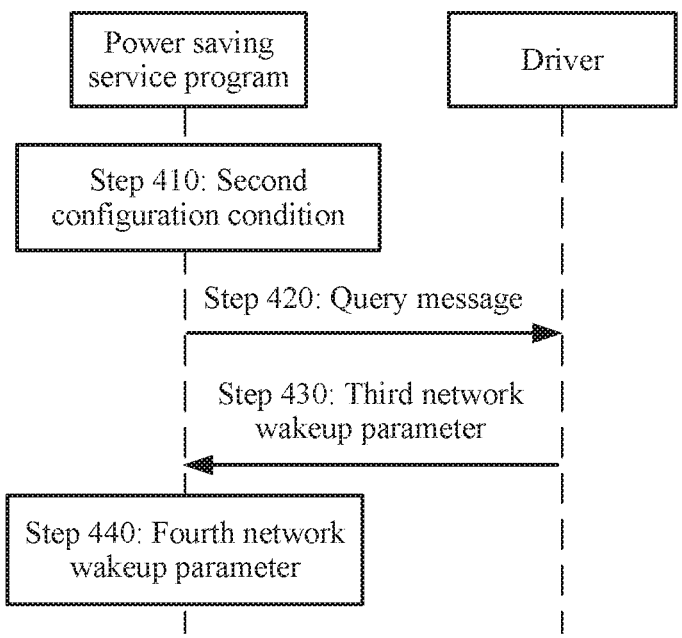
FIG. 4 is a diagram of interaction between a power saving service program and a driver according to an embodiment of this application.
Figure 5:
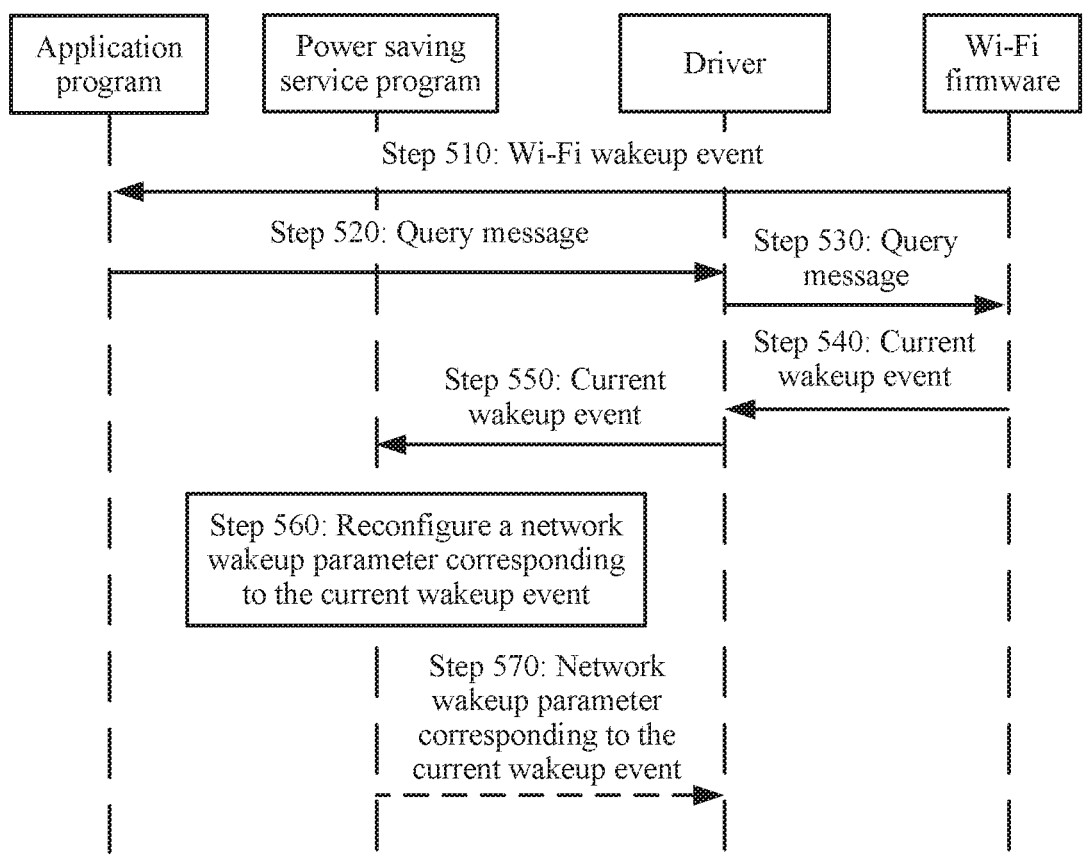
FIG. 5 is a diagram of interaction between an application program, a power saving service program, a driver, and Wi-Fi firmware according to an embodiment of this application.

The following specifically describes FIG. 2 with reference to FIG. 3 to FIG. 5.

FIG. 3 is a diagram of interaction between an application program, a power saving service program, and a driver according to an embodiment of this application. As shown in FIG. 3, the method includes the following steps.

Step 310: The application program sends a first network wakeup parameter to the driver.

The first network wakeup parameter is set in the driver when any application program is installed in Windows. The first network wakeup parameter is used to wake up the application program in a standby mode.

Correspondingly, the driver receives the first network wakeup parameter sent by the application program.

Step 320: The driver reports the first network wakeup parameter to the power saving service program.

After receiving the first network wakeup parameter, the driver actively reports the first network wakeup parameter to the power saving service program.

Step 330: The power saving service program performs reconfiguration processing.

A first configuration condition is preset in the power saving service program. The reconfiguration processing may be performed on the first network wakeup parameter based on the first configuration condition.

In an embodiment, the first network wakeup parameter needs to be set when a QQ application program is installed on a terminal. In this case, the driver reports the first network wakeup parameter to the power saving service program. The first network wakeup parameter may be a time parameter, for example, waking up the application program at 06:10:01. When the preset first configuration condition is forbidding the terminal to be woken up from 24:00:00 to 7:00:00, the power saving service program may perform reconfiguration processing on the first network wakeup parameter to obtain a second network wakeup parameter. When the reconfiguration processing is rewriting the first network wakeup parameter, the obtained second network wakeup parameter may be forbidding the terminal to be woken up at 06:10:01.

It should be noted that the reconfiguration processing performed by the power saving service program is not limited to the foregoing processing manner, and the power saving service program may alternatively perform an operation on the first network wakeup parameter, for example, delete the first network wakeup parameter. Details are not described herein.

Step 340: The power saving service program sends a second network wakeup parameter to the driver.

After receiving the second network wakeup parameter, the driver updates the first network wakeup parameter to the second network wakeup parameter.

When the terminal enters a sleep mode next time, the driver may write the second network wakeup parameter into firmware such as Wi-Fi firmware. The Wi-Fi firmware may perform processing when the first network wakeup parameter is received next time, thereby reducing a quantity of times the application program is woken up, and reducing power consumption of the terminal.

In an embodiment, the terminal may write the second network wakeup parameter of forbidding the terminal to be woken up at 06:10:01 into the driver. The driver writes the second network wakeup parameter of forbidding the terminal to be woken up at 06:10:01 into the Wi-Fi firmware. In this case, when the Wi-Fi firmware receives the first network wakeup parameter next time, for example, when the time parameter in the first network wakeup parameter is waking up the terminal at 06:10:01, the Wi-Fi firmware may directly process the first network wakeup parameter without waking up the application program. In this way, a network wakeup parameter is processed by the power saving service program and the driver. This reduces a quantity of times the application program is woken up, reduces power consumption of the terminal, and prolongs a standby time of the terminal.

FIG. 4 is a diagram of interaction between a power saving service program and a driver according to an embodiment of this application. As shown in FIG. 4, after the power saving service program performs reconfiguration processing, the following steps are included:

Step 410: A terminal updates a first configuration condition to obtain a second configuration condition.

In an embodiment, the terminal may update the first configuration condition preset in the power saving service program, for example, update a time parameter in the first configuration condition from forbidding an application program to be woken up from 24:00:00 to 07:00:00 to forbidding the application program to be woken up from 24:00:00 to 12:00:00 in the second configuration condition.

Step 420: The power saving service program sends a query message to the driver to obtain a third network wakeup parameter currently configured by the driver.

Step 430: The driver reports the third network wakeup parameter to the power saving service program.

Step 440: The power saving service program updates the third network wakeup parameter based on the second configuration condition to obtain a fourth network wakeup parameter.

In an embodiment, a time parameter in the obtained third network wakeup parameter is, for example, waking up the application program at 10:05:23. The second configuration condition is forbidding the application program to be woken up from 24:00:00 to 12:00:00. The power saving service program performs reconfiguration processing on the third network wakeup parameter based on the second configuration condition. When the reconfiguration processing is rewriting the third network wakeup parameter, a time parameter in the obtained fourth network wakeup parameter may be not waking up the application program at 10:05:23.

The power saving service program may send the query message to the driver to obtain the current network wakeup parameter of the driver, reconfigure the current network wakeup parameter, and send the reconfigured network wakeup parameter to the driver. Then the driver writes the reconfigured network wakeup parameter into Wi-Fi firmware. In this way, the network wakeup parameter is managed and controlled, and power consumption of the terminal is reduced.

FIG. 5 is a diagram of interaction between an application program, a power saving service program, a driver, and Wi-Fi firmware according to an embodiment of this application. As shown in FIG. 5, the method includes the following steps.

Step 510: The Wi-Fi firmware sends a Wi-Fi wakeup event to the application program.

This step is the same as that in the prior art. A protocol stack of a Wi-Fi chip communicates with a network. When receiving a Wi-Fi event by using the protocol stack, the Wi-Fi firmware of the Wi-Fi chip sends the Wi-Fi wakeup event to the application program.

Correspondingly, the application program receives the Wi-Fi wakeup event.

Step 520: The application program sends a query message to the driver to query a current wakeup event.

For example, the current wakeup event is specifically a wakeup event of a type, such as a QQ wakeup event, a Jingdong wakeup event, or a Tmall wakeup event.

Correspondingly, the driver receives the query message sent by the application program.

Step 530: The driver sends a query message to the Wi-Fi firmware to query the current wakeup event.

After receiving the query message sent by the driver, the Wi-Fi firmware determines the current wakeup event.

Step 540: The Wi-Fi firmware reports the current wakeup event to the driver.

Correspondingly, the driver receives the current wakeup event.

Step 550: The driver sends the current wakeup event to the power saving service program.

Correspondingly, the power saving service program receives the current wakeup event sent by the driver.

Step 560: The power saving service program reconfigures, based on the current wakeup event, a network wakeup parameter corresponding to the current wakeup event.

After step 560, the method further includes step 570: The power saving service program sends the network wakeup parameter corresponding to the current wakeup event to the driver.

In this way, the driver actively reports the current wakeup event to the power saving service program. Subsequently, the power saving service program may reconfigure the network wakeup parameter of the current wakeup event to reduce power consumption of a terminal and prolong a standby time of the terminal.

Figure 6:
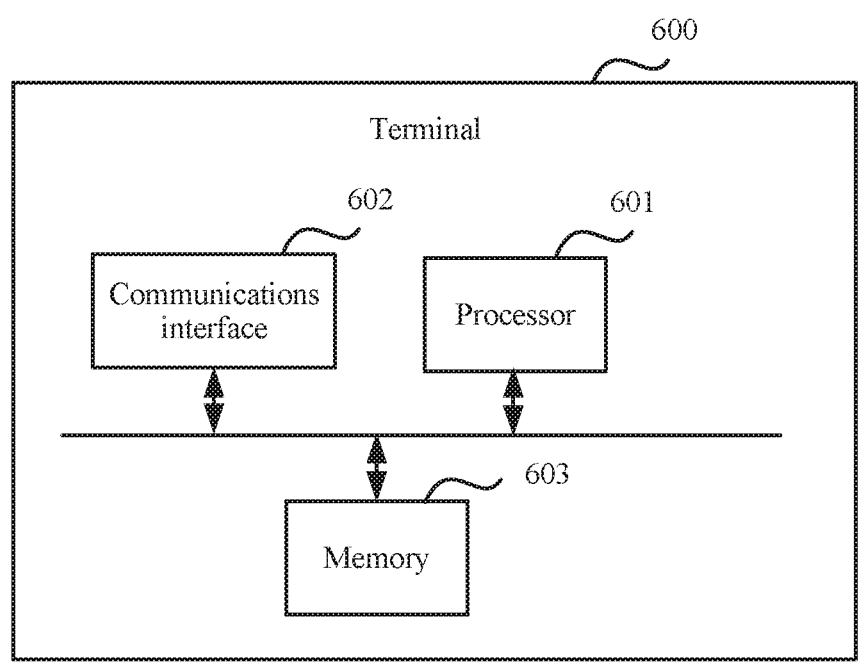
FIG. 6 is a schematic structural diagram of a terminal according to an embodiment of this application.

FIG. 6 is a schematic structural diagram of a terminal according to an embodiment of this application. As shown in FIG. 6, the terminal 600 includes a processor 601, a communications interface 602, and a memory 603. The communications interface 602, the processor 601, and the memory 603 may be connected by using a bus. The communications interface 602 is configured to support communication between the terminal and another network entity.

The memory 603 is configured to store a program. Only one memory is shown in FIG. 6. Certainly, a plurality of memories may be disposed as required. Alternatively, the memory 603 may be a memory in the processor 603.

The memory 603 stores the following elements: an executable module or a data structure, a subset thereof, or an extended set thereof:

an operation instruction, including various operation instructions and used to implement various operations; and an operating system, including various system programs and used to implement various basic services and process a hardware-based task.

The processor 601 controls an operation of the terminal 600, and the processor 601 may be alternatively referred to as a CPU.

The data processing methods disclosed in the foregoing embodiments of this application may be applied to the processor 601, or implemented by the processor 601. The processor 601 may be an integrated circuit chip and has a signal processing capability. In an implementation process, each step of the foregoing method may be completed by using an integrated logical circuit of hardware in the processor 601 or an instruction in a form of software. The processor 601 may be a general-purpose processor, a DSP, an ASIC, an FPGA, or another programmable logic device, a discrete gate or transistor logic device, or a discrete hardware component, and may implement or perform methods, steps, and logical block diagrams disclosed in the embodiments of this application (for example, the methods shown in FIG. 2 to FIG. 5). The general-purpose processor may be a microprocessor or the processor may be any conventional processor, or the like. Steps of the methods disclosed in the embodiments of this application may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or some of the steps in each of the foregoing methods of the embodiments may be implemented by a program instructing a processor. The program may be stored in a computer readable storage medium. The storage medium may be a non-transitory (English: non-transitory) medium, such as a random access memory, a read-only memory, a flash memory, a hard disk, a solid-state drive, a magnetic tape (English: magnetic tape), a floppy disk (English: floppy disk), an optical disc (English: optical disc), or any combination thereof.

What is claimed is:

1. A data processing method implemented by a terminal, the method comprising:
obtaining a first network wakeup parameter for waking up an application program;
performing first reconfiguration processing on the first network wakeup parameter based on a preset first configuration condition to obtain a second network wakeup parameter; and
configuring a first driver of the terminal based on the second network wakeup parameter.

2. The method of claim 1, wherein the first network wakeup parameter is associated with a disassociation of the terminal with an access point.

3. The method of claim 1, wherein the first driver comprises a Wi-Fi driver.

4. The method of claim 3, further comprising writing the second network wakeup parameter into a Wi-Fi firmware when an operating system of the terminal enters a sleep mode.

5. The method of claim 1, further comprising:
receiving a current wakeup event from the first driver; and
setting, based on the current wakeup event, a network wakeup parameter corresponding to the current wakeup event.

6. The method of claim 1, further comprising:
updating the first configuration condition to obtain a second configuration condition;
obtaining a third network wakeup parameter configured by the first driver;
performing second reconfiguration processing on the third network wakeup parameter based on the second configuration condition to obtain a fourth network wakeup parameter; and
sending the fourth network wakeup parameter to the first driver.

7. The method of claim 1, wherein performing the first reconfiguration processing on the first network wakeup parameter based on the first configuration condition to obtain the second network wakeup parameter comprises rewriting the first network wakeup parameter.

8. The method of claim 1, wherein performing the first reconfiguration processing on the first network wakeup parameter based on the first configuration condition to obtain the second network wakeup parameter comprises deleting the first network wakeup parameter.

9. A terminal, comprising:
at least one processor; and
a memory coupled to the at least one processor and storing programming instructions that, when executed by the at least one processor, cause the terminal to be configured to:
obtain a first network wakeup parameter for waking up an application program;
perform first reconfiguration processing on the first network wakeup parameter based on a preset first configuration condition to obtain a second network wakeup parameter; and
configure a first driver of the terminal based on the second network wakeup parameter.

10. The terminal of claim 9, wherein the first network wakeup parameter is associated with a disassociation of the terminal with an access point.

11. The terminal of claim 9, wherein the first driver comprises a Wi-Fi driver.

12. The terminal of claim 11, wherein the programming instructions further cause the terminal to be configured to write the second network wakeup parameter into a Wi-Fi firmware when an operating system of the terminal enters a sleep mode.

13. The terminal according to claim 9, wherein the programming instructions further cause the terminal to be configured to:
receive a current wakeup event from the first driver; and
set a network wakeup parameter corresponding to the current wakeup event based on the current wakeup event.

14. The terminal according to claim 9, wherein the programming instructions further cause the terminal to be configured to:
update the first configuration condition to obtain a second configuration condition;
obtain a third network wakeup parameter configured by the first driver;
perform second reconfiguration processing on the third network wakeup parameter based on the second configuration condition to obtain a fourth network wakeup parameter; and
send the fourth network wakeup parameter to the first driver.

15. A non-transitory computer-readable storage medium storing computer-readable program code that, when executed by a processor of an apparatus, causes the apparatus to be configured to:
obtain a first network wakeup parameter for waking up an application program;
perform first reconfiguration processing on the first network wakeup parameter based on a preset first configuration condition to obtain a second network wakeup parameter; and
configure a first driver of a terminal based on the second network wakeup parameter.

16. The non-transitory computer-readable storage medium of claim 15, wherein the first network wakeup parameter is associated with a disassociation of the apparatus with an access point.

17. The non-transitory computer-readable storage medium of claim 15, wherein the first driver comprises a Wi-Fi driver.

18. The non-transitory computer-readable storage medium of claim 17, wherein the computer-readable program code is further configured to cause the apparatus to be configured to write the second network wakeup parameter into a Wi-Fi firmware when an operating system of the terminal enters a sleep mode.

19. The non-transitory computer-readable storage medium of claim 15, wherein the computer-readable program code is further configured to cause the apparatus to be configured to:
receive a current wakeup event sent by from the first driver; and
set, based on the current wakeup event, a network wakeup parameter corresponding to the current wakeup event.

20. The non-transitory computer-readable storage medium according to claim 15, wherein the computer-readable program code is further configured to cause the apparatus to be configured to:
update the first configuration condition to obtain a second configuration condition;
obtain a third network wakeup parameter currently configured by the first driver;

perform second reconfiguration processing on the third network wakeup parameter based on the second configuration condition to obtain a fourth network wakeup parameter; and send the fourth network wakeup parameter to the first driver.

\* \* \* \* \*